Patented Jan. 5, 1937

2,066,759

UNITED STATES PATENT OFFICE 2,066,759

COATING COMPOSITION

Leavitt N. Bent, Holly Oak, Del., assignor to Hercules Powder Company, Wilmington, Del., a corporation of Delaware No Drawing. Application November 10, 1928, Serial No. 318,597

7 Claims. (Cl. 134—26)

My invention relates to an improvement in coating compositions, and more particularly to such coating compositions as varnishes, lacquers, and the like.

The coating composition according to my invention involves the use of an ester gum of the character produced by reacting on abietic acid with a tetra or higher polyhydric alcohol, such, for example, as pentaerythrite, $C(CH_2OH)_4$, enneaheptite, $C_9H_{13}(OH)_7$ and erythritol, $C_4H_6(OH)_4$, and the like and which possesses characteristics enabling the production of a film and/or coating of great hardness and, at the same time, having desirable clarity and elasticity.

The coating composition in accordance with my invention may, for example, involve as an ingredient pentaerythrite abietate together with a suitable solvent therefor and such other ingredients as may be desirable. For example, in a lacquer or varnish, the ester, as for example, pentaerythrite abietate, may replace fossil gums in whole or in part. By way of illustration, a varnish in accordance with my invention will involve pentaerythrite abietate and linseed oil, to which may be added other ingredients, as for example, litharge, lead linoleate, etc. Such a varnish may also, if desired, include fossil gums and other ingredients.

As a further illustration, a lacquer having desirable characteristics, may, in accordance with my invention, contain a nitrated carbohydrate, as for example, nitrocellulose or nitrated starch, pentaerythrite abietate and a solvent therefor. Such a lacquer may also include various other ingredients usually used in lacquers, as for example, castor oil, toluol, ethyl alcohol, etc.

Coating compositions in accordance with my invention may include, for example, pentaerythrite abietate in a wide range of proportion and, as has been indicated, may also include a nitrated carbohydrate, fossil gums, which may be replaced in whole or in part by the abietate, and such other ingredients as are customarily used in compositions of the character desired to be produced.

The ester included in coating compositions in accordance with my invention may be produced by reacting on abietic acid relatively pure, or as found in rosin, as for example, wood or gum rosin tetra or higher polyhydric alcohol, preferably in the presence of a catalyst, the reaction being effected by heating. For example, pentaerythrite abietate may be produced by refluxing 320 parts of rosin with 20 parts of pentaerythrite at a temperature say within about the range 260° C. to 270° C. for a period of say about six hours, a chemically inert atmosphere being maintained during the heating period, as for example, by the introduction into the vessel in which the heating is effected of a current of carbon dioxide gas. Desirably, a catalyst, such as, for example, powdered zinc, boric anhydride, etc., is used for facilitating the reaction. The ester produced will be clear, will have a low acid number and will give to the coating composition in which it is included a capacity for forming a quick drying film having desirable hardness and, at the same time, desirable elasticity to a high degree. The ester will also have desirable solubility in the other solvents used in varnishes and lacquers.

By way of illustration of the adaptation of my invention, for example, in connection with a lacquer including a nitrated carbohydrate as, for example, nitrocellulose or nitrostarch, such may include nitrated carbohydrate and pentaerythrite abietate in desired proportions, depending upon the ultimate use for which the composition may be intended, a solvent, diluent, suitable oil and such other ingredients as may be desired.

A lacquer having desirable characteristics and which will produce a clear, hard and, at the same time, elastic film may contain the ingredients in the proportions shown in the following table:

|  | Per cent |
|---|---|
| Nitrated carbohydrate (nitrocellulose, nitrostarch, or the like) | 9 |
| Pentaerythrite abietate | 10 |
| Castor oil | 2 |
| Butyl acetate | 30 |
| Toluol | 35 |
| Butanol | 10 |
| Ethyl alcohol | 4 |

It will be understood that the formulae given above are merely by way of illustration and shall not be taken as restricting the scope of my invention, it being understood that the abietic acid ester of polyhydric alcohols other than pentaerythrite abietate, such, for example, as the abietic acid ester of pentahydric alcohol, as pentaerythrite, or a heptahydric alcohol, as enneaheptite, may be used in place of pentaerythrite abietate. It will also be understood that the ester may be used in an amount outside the amounts given above and that the particular ingredients mentioned in the above tables may be widely departed from either by the addition, substitution, or limitation of the ingredients.

As an illustration of the practical adaptation of my invention in connection with a varnish, for example, a varnish in accordance with my invention may include pentaerythrite abietate and linseed oil with which may be included other ingredients, as litharge, lead linoleate, and the like. The varnish in accordance with my invention may also include ester gum if desired, it being understood that the ester may be used to replace fossil gum in whole or in part.

A typical varnish in accordance with my invention and which will have the capacity for producing a clear, hard film having desirable elasticity, may contain the ingredients in the proportions shown in the following table:

| | Parts |
|---|---|
| Pentaerythrite abietate | 100 |
| Linseed oil | 800 |
| Litharge | 5½ |
| Lead linoleate | 1½ |

It will be understood that in varnishes in accordance with my invention, as has been indicated, in connection with lacquers, the abietic acid esters of polyhydric alcohols other than pentaerythrite abietate may be substituted therefor and that I do not intend that my invention shall be limited to the particular ingredients or proportions of ingredients given in the above tables.

What I claim and desire to protect by Letters Patent is:

1. A coating composition including as ingredients a drying oil and pentaerythrite abietate.
2. A coating composition including as ingredients a nitrated carbohydrate, pentaerythrite abietate and a liquid solvent thereof.
3. A coating composition including as ingredients nitrated cellulose, pentaerythrite abietate and a liquid solvent thereof.
4. A coating composition including as ingredients pentaerythrite abietate and a substance from the group consisting of a drying oil and a nitrated carbohydrate.
5. A coating composition including as ingredients pentaerythrite abietate and linseed oil.
6. A varnish including as ingredients pentaerythrite abietate about 100 parts, linseed oil about 800 parts, litharge about 5.5 parts and lead linoleate about 1.5 parts.
7. A lacquer including as ingredients pentaerythrite abietate about 10%, a nitrated carbohydrate about 9%, castor oil about 2%, butyl acetate about 30%, toluol about 35%, butanol about 10% and ethyl alcohol about 4%.

LEAVITT N. BENT.